Feb. 20, 1923.
L. B. GRAHAM
OIL PIPE LINE
Filed Sept. 28, 1921
1,445,880
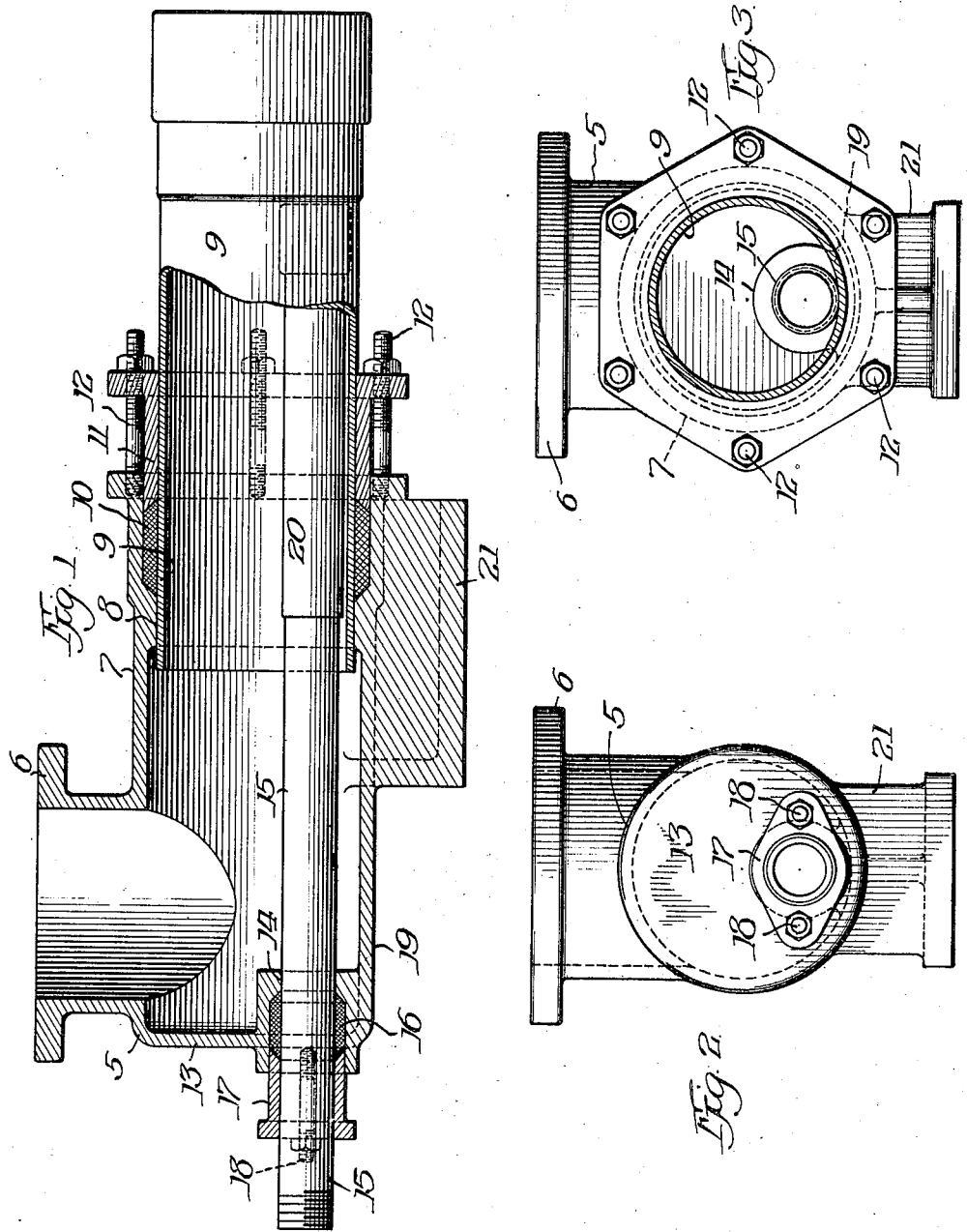
Witness:
Inventor:
Leslie B. Graham
By Wilkinson, Huxley, Byron & Knight
Attys.

Patented Feb. 20, 1923.

1,445,880

UNITED STATES PATENT OFFICE.

LESLIE B. GRAHAM, OF CHICAGO, ILLINOIS.

OIL PIPE LINE.

Application filed September 28, 1921. Serial No. 503,895.

*To all whom it may concern:*

Be it known that I, LESLIE B. GRAHAM, a citizen of the United States, residing at Chicago, in the county of Cook and State of Illinois, have invented certain new and useful Improvements in Oil Pipe Lines, of which the following is a specification.

This invention relates to pipe lines for conveying oil or other fluid, the consistency of which varies seriously with changes in temperature, and particularly to a pipe line within which is contained a pipe for circulating a heating medium.

Heretofore, it has been the practice in pipe lines of this kind to provide slip joints for the conduit or pipe containing the fluid to be conveyed, and also for the pipe of the heating medium, and these slip joints have generally been associated with a T, L, or other fitting in the conduit by mounting thereon a complication of headers, flange couplings, nipples, expansion joints, and the like, through the medium of which the conveying pipe and the heating pipe might move longitudinally relatively to each other, and each move relatively to the fitting, in response to changes in their length resulting from differences in temperature.

The object of the present invention is to provide a fitting which will embody in its construction fluid tight slip joint bearings for both the conduit and heating members of the organization of parts above referred to, and serve to present a conduit and heating pipe in desired telescoping relation to each other.

Accordingly, the invention consists in providing an elbow or equivalent fitting with an integral sliding joint seat within the end of one of its angularly related arms, of a size that will receive substantially the full capacity of conduit pipe in sliding relation thereto, and with a packing gland coacting with said seat to develop a fluid tight closure around the inserted pipe; and forming integrally with an end wall of said elbow, that lies opposite the end of the inserted conduit pipe and eccentrically thereto, a reduced sliding seat for the heating pipe, and equipping the same with a packing gland adapted to form a fluid tight joint around a heating pipe introduced thereinto; the heating pipe seat being preferably located in the angle between the end wall and a longitudinal wall of the elbow, and integral with said walls, in a manner to sustain the walls of the seat and greatly strengthen the structure against bending strains which tend to throw the heating pipe out of alignment; said reduced heating pipe seat being at the same time positioned to permit the usual slip joint in the heating pipe to lie upon the bottom wall of the conduit pipe. The elbow preferably has formed integrally with it a sustaining foot or base upon which it rests in supporting the loads of the pipes resting in the sliding seats.

In the accompanying drawing—

Figure 1 is a side elevation, mainly in vertical longitudinal section, showing a fitting unit embodying the several features of the present invention.

Figure 2 is an end elevation of the same, seen from the left of Figure 1; and

Figure 3 is an elevation of the opposite end with the conduit pipe in section.

5 represents an elbow fitting having the usual arm 6 for flange coupling or other connection in a pipe line, and having an arm 7 to receive a pipe at an angle thereto. The arm 7 is formed with an integral seat 8 adapted to receive and support a pipe 9 with freedom of sliding movement that may be induced by expansion and contraction of such pipe under changes of temperature. Beyond the seat 8 the arm 7 is enlarged to provide space for a packing 10, and within this space is fitted a known type of packing gland 11 adapted to be drawn up to compress the packing through the medium of screws 12. In a wall 13 opposite the end of the pipe 9, is integrally formed a seat 14 to receive and support a heating pipe 15 with freedom to slide to an extent necessitated by expansion and contraction of such heating pipe, or necessitated by relative movement between the fitting 5 and said pipe; and beyond this seat 14, the wall is formed with a space to receive a packing gland 17 adapted to be pressed inward by screws 18 in the usual manner. Seat 14 is cast integrally not only with the end wall 13 but with the bottom wall 19 of the fitting, in this manner not only greatly strengthening the walls 13 and 19 but throwing the seat 14 in an eccentric position and presenting the pipe 15 along the bottom of the pipe 9 so that a slip joint 20, which is usually provided in a heating pipe 15 in this situation, may be supported upon the bottom of said pipe 9. The elbow 5 preferably has cast integrally with it the supporting foot or base 21 which sustains it and the load imposed upon it through the pipes with which it is connected.

I claim:

1. In a pipe line having an enclosed heating pipe, an expansion joint for combining such pipes with freedom of relative longitudinal movement, comprising an elbow having a leg formed with an internal seat providing sliding support for a line pipe coaxial with said leg, and having a transverse wall opposed to the inner end of said leg, formed with an internal seat providing sliding support for a heating pipe parallel with but eccentric to said line pipe.

2. In a pipe line having an enclosed heating pipe, an expansion joint for combining such pipes with freedom of relative longitudinal movement, comprising an elbow having a leg formed with an internal seat providing sliding support for a line pipe coaxial with said leg, and having a transverse wall opposed to the inner end of said leg, formed with an internal seat providing sliding support for a heating pipe parallel with but eccentric to said line pipe; the last-named seat being integral with said transverse wall and with the bottom wall of said leg.

3. In a pipe line having an enclosed heating pipe, an expansion joint for combining such pipes with freedom of relative longitudinal movement, comprising an elbow having a leg formed with an internal seat providing sliding support for a line pipe coaxial with said leg, and having a transverse wall opposed to the inner end of said leg, formed with an internal seat providing sliding support for a heating pipe parallel with but eccentric to said line pipe; said elbow-fitting having an integral supporting base beneath said line pipe seat.

Signed at Chicago, Illinois, this 26th day of September, 1921.

LESLIE B. GRAHAM.